(No Model.)
W. C. COWEN.
CAR COUPLING.
No. 324,366. Patented Aug. 18, 1885.
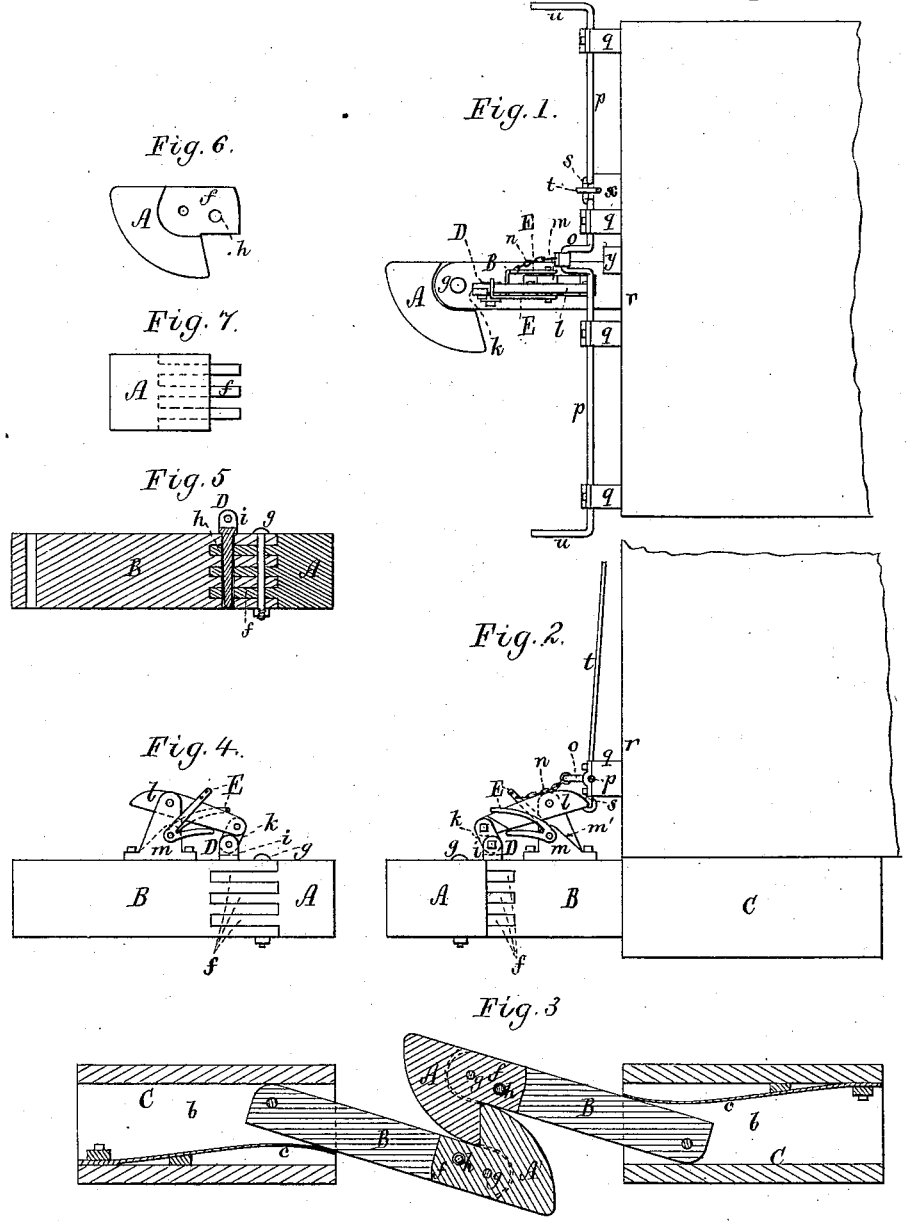
Witnesses.
S. N. Piper
Ernest P. Pratt.
Inventor.
William C. Cowen.
by R. H. Eddy atty

UNITED STATES PATENT OFFICE.

WILLIAM CHARLES COWEN, OF HYDE PARK, MASSACHUSETTS.

CAR-COUPLING.

SPECIFICATION forming part of Letters Patent No. 324,366, dated August 18, 1885.

Application filed May 18, 1885. (No model.)

*To all whom it may concern:*

Be it known that I, WILLIAM CHARLES COWEN, of Hyde Park, in the county of Norfolk, of the Commonwealth of Massachusetts, have invented a new and useful Improvement in Railway-Car Couplings; and I do hereby declare the same to be described in the following specification and represented in the accompanying drawings, of which—

Figure 1 is a top view, Fig. 2 a side elevation, and Fig. 3 a horizontal section, of a car-coupling containing my invention, the nature of which is defined in the claims hereinafter presented. Fig. 4 is an outer side view, and Fig. 5 a longitudinal and vertical section of one of the coupling-hooks and its attached swing-bar of such car-coupling. Fig. 6 is a top view, and Fig. 7 a side view, of one of the movable hooks of the coupling.

In such drawings, A A' denote two coupling-hooks, each of which is hinged to a bar, B, extending within and outwardly from a draw-bar, C. The said bar B at or near its rear end is pivoted to the draw-bar in a manner to enable the bar B to swing laterally within the chamber $b$ of its draw-bar. There is fixed to each draw-bar in its chamber, and to bear against the outer side of the bar B, a spring, $c$. Each hook A or A' is separate from and hinged to its bar B, the hooks being formed as shown in Figs. 5 and 6. The shank portions $f$ of the hook extend lengthwise within the swing-bar B at its outer end, and are connected thereto by a joint-pin, $g$, going down through them and the bar. The said shank portions also project back of the joint-pin into the bar, and there is within them and through the bar and in rear of the joint-pin a hole, $h$, to receive a pin, D, which I generally make somewhat tapering from its head $i$, downward. Each pin D is connected by a link, $k$, to a lifting-lever, $l$, fulcrumed to a standard, $m$, erected on the bar, there being to such standard a shoulder, $m'$, for the lesser or lower arm of the lever to bring up against when the pin D is raised high enough for the hook to be turned on its joint-pin.

There is fulcrumed to the standard a lever, E, to extend both under and over the longer arm of the lever $l$, such lever E being, by a chain, $n$, connected to a double crank, $o$, projecting from a rock-shaft, $p$, fulcrumed to brackets $q$, extending from the next adjacent end, $r$, of the car. To such shaft there is another double crank, $s$, that extends down from it when the first-named crank is horizontal and the pin D is within the bar B and the shank portions of the hook jointed to such bar. A lifting-rod, $t$, is pivoted to the wrist of the crank $s$ and extends upward to the top of the car. Furthermore, the said rock-shaft extends to or nearly to or beyond each side of the car, and there is a handle, $u$, projected from it (the said shaft) to enable a person, without going between the cars, to manipulate or turn the rock-shaft in order to effect either the raising or falling of the pin D.

Flanking one of the brackets $q$ are projections or stops $x$ and $y$, that extend from the end of the car. On revolving the rock-shaft sufficiently to cause the pin D to rise out of the shank of the hook, the double crank $o$ will be brought down upon the top of the stop $y$. The other double crank bears against the front end of the stop $x$ when the pin D is at its lowest position in the bar B.

In coupling two cars, one of them is to be moved toward the other, so as to carry the hook of the first into contact with and to pass by that of the other. In so doing both coupling-bars will be moved aside to allow one hook to pass by the other. Immediately on such having been completed the bars will be moved so as to cause the two hooks to hook upon or couple with each other.

To effect the uncoupling of the hooks, one of their pins D is to be drawn upward, and the cars should be moved apart or away from each other, or one away from the other, in which case one hook will swing around and unclutch or separate from the other.

I claim—

1. The combination of the coupling-hook and the swing-bar jointed together, as set forth, the draw-bar chambered to receive the swing-bar and pivoted thereto, and provided with a spring to bear against such swinging bar, and the pin going through the swing-bar and the shank of the hook, and mechanism for effecting the lifting of such pin and sustaining it in its raised position, all being substantially as set forth.

2. The combination for not only sustaining in its raised position the pin D for holding the coupling-hook A or A' from turning in the swing-bar B, but for effecting the lifting of such pin, the said combination consisting of the standard $m$, its shoulder $m'$, the link $k$, two levers, $l$ and E, the chain $n$, the double-cranked rock-shaft $p$, and the stop $y$ for the double crank $o$ when forced backward to bear or rest on, all being substantially as set forth, and such crank-shaft being provided with means of turning it, and connected to the car, essentially as specified.

WILLIAM CHARLES COWEN.

Witnesses:
R. H. EDDY,
ERNEST B. PRATT.